United States Patent [19]

Yoshihara

[11] Patent Number: 5,506,056
[45] Date of Patent: Apr. 9, 1996

[54] THERMOPLASTIC RESIN COMPOSITION AND USE THEREOF

[75] Inventor: Yukio Yoshihara, Kuga, Japan

[73] Assignee: Mitsui Petrochemical Industries, Ltd., Tokyo, Japan

[21] Appl. No.: 478,644

[22] Filed: Jun. 7, 1995

Related U.S. Application Data

[62] Division of Ser. No. 185,158, Jan. 24, 1994, Pat. No. 5,480,937, which is a continuation of Ser. No. 49,590, Apr. 20, 1993, abandoned, which is a continuation of Ser. No. 929,499, Aug. 18, 1992, abandoned, which is a continuation of Ser. No. 522,585, May 14, 1990, abandoned.

[30] Foreign Application Priority Data

May 12, 1989 [JP] Japan ..................... 1-119077
May 12, 1989 [JP] Japan ..................... 1-119078
Mar. 30, 1990 [JP] Japan ..................... 2-85201
Mar. 30, 1990 [JP] Japan ..................... 2-85207

[51] Int. Cl.$^6$ .......................... B32B 33/00; C08L 51/06; C08L 77/06

[52] U.S. Cl. .................... 428/409; 384/7; 384/50; 384/908; 384/909; 428/36.9

[58] Field of Search .................. 428/36.9, 409; 384/908, 909

[56] References Cited

U.S. PATENT DOCUMENTS 4,923,925  5/1990  Chiba et al. ................... 525/66

Primary Examiner—James C. Cannon
Attorney, Agent, or Firm—Sherman and Shalloway

[57] ABSTRACT

In accordance with the present invention, there are provided thermoplastic resin compositions comprising 80–40 parts by weight of specific aromatic polyamides (A) containing 30–100 mol % of terephthalic acid component units and 20–60 parts by weight of modified polyolefins (B) graft modified with α,β-unsaturated carboxylic acid, anhydride or derivative thereof and having a crystallinity index of at least 35% or a glass transition temperature of at least 90° C. and an intrinsic viscosity [η] of 0.4–35 dl/g. With these compositions, there are prepared sliding parts such as gear and cam and electrical molding parts such as connector.

3 Claims, 1 Drawing Sheet

THERMOPLASTIC RESIN COMPOSITION AND USE THEREOF

This is a division of application Ser. No. 08/185,158, filed Jan. 24, 1994, now U.S. Pat. No. 5,480,937; which is a continuation of application Ser. No. 08/049,590, filed Apr. 20, 1993; which is a continuation of application Ser. No. 07/929,499, filed Aug. 18, 1992; which is a continuation of application Ser. No. 07/522,585, filed May 14, 1990, all of the latter three of which are abandoned.

FIELD OF THE INVENTION

This invention relates to thermoplastic resin compositions and uses thereof, and more particularly to such thermoplastic resin compositions as capable of giving molded articles which are excellent in balance between toughness and rigidity, impact resistance, heat resistance and water resistance and, at the same time, which are warpless and excellent in resistance to deformation.

BACKGROUND OF THE INVENTION

Electrical molding parts such as connector, coil bobbin and housing used in the fields of automotive industry, electrical and electronic industries have heretofore been prepared from polycapramide (nylon 6), polyhexamethylene adipamide (nylon 66) and polybutylene terephthalate (PBT).

However, molded articles obtained from the above-mentioned polycapramide or polyhexamethylene adipamide were not always found to have satisfactory performance when used as electrical molding parts in the fields of automotive industry, electrical and electronic industries. For instance, because of poor water resistance, these molded articles absorb water and undergo dimensional change and change in physical properties. Because deformation (warping) takes place in these molded articles, moreover, there were such problems concerning with resistance to deformation that various troubles such as poor engagement and cracking arise when these molded articles are incorporated into end products. Further, molded articles obtained from the above-mentioned polybutylene terephthalate do not always exhibit sufficient heat resistance, and these molded articles also involved the same problems concerning with resistance to deformation as in the case of the molded articles obtained from the above-mentioned polycapramide or polyhexamethylene adipamide.

Because of excellent mechanical properties and abrasion resistance, polyamides are widely used for sliding parts such as gear, cam and bearing. In this connection, Japanese Patent L-O-P Publn. No. 144351/1985 discloses polyamide resin compositions obtained by melt kneading of 70–98% by weight of polyamide (aliphatic polyamide) and 30–2% by weight of ultra-high-molecular-weight particulate polyethylene having a specific size distribution. However, such aliphatic polyamide resin compositions as disclosed do not always have sufficient heat resistance and self-lubrication, though they are excellent in mechanical properties and abrasion resistance.

Furthermore, Japanese Patent L-O-P Publn. No. 57458/1987 discloses polyamide compositions comprising specific aromatic polyamides and polyamides as those which are excellent in heat-resisting properties, mechanical properties, physicochemical properties and molding characteristics. However, such aromatic polyamide resin compositions as disclosed above have improved heat resistance in comparison with the above-mentioned aliphatic polyamide resin compositions, but the effect of improving heat resistance of said aromatic polyamide resin compositions was not always sufficient and self-lubrication of said compositions was also not always sufficient.

Under these circumstances, the present inventors prosecuted extensive researches with the view of solving such problems associated with the prior art as mentioned above, and have eventually found that injection molded articles which are excellent in balance between toughness and rigidity, impact resistance, heat resistance and water resistance and, at the same time, which are warpless and excellent in resistance to deformation are obtained by carrying out injection molding process using themoplastic resin compositions prepared by mixing in specific proportion, aromatic polyamides comprising specific aromatic dicarboxylic acid component units and specific diamine component units, and high molecular weight modified polyolefins having a specific intrinsic viscosity [η], graft modified with α,β-unsaturated carboxylic acid, anhydride or derivative thereof and having a crystallinity index of at least 35% or a glass transition temperature of at least 90° C. On the basis of the above finding, the present invention has been accomplished.

In this connection, Japanese Patent L-O-P Publn. No. 144362/1985 discloses polyamide compositions comprising polyamides and modified olefin elastic polymers having a crystallinity index of less than 20%, said composition being alleged to be excellent in mechanical strength such as impact resistance.

OBJECT OF THE INVENTION

The present invention is intended to solve such problems associated with the prior art as mentioned above, and an object of the invention is to provide thermoplastic resin compositions capable of giving molded articles which are excellent in balance between toughness and rigidity, impact resistance, heat resistance and water resistance and, at the same time, which are also excellent in resistance to deformation.

SUMMARY OF THE INVENTION

The thermoplastic resin compositions of the present invention are characterized by containing 80–40 parts by weight of aromatic polyamide (A) having an intrinsic viscosity [η] of 0.5–3.0 dl/g as measured in concentrated sulfuric acid at 30° C. and a melting point of at least 280° C., and 20–60 parts by weight of modified polyolefin (B) having a crystallinity index of at least 35% or a glass transition temperature of at least 90° C. and an intrinsic viscosity [η] of 0.4–35 dl/g (provided that the sum total of the components (A) and (B) is 100 parts by weight), said aromatic polyamide (A) being composed of a recurring unit containing aromatic dicarboxylic acid component units (i) comprising 30–100 mol % of terephthalic acid component units, 0–40 mol % of aromatic dicarboxylic acid components other than the terephthalic acid component units and 0–70 mol % of aliphatic dicarboxylic acid component units and diamine component units (ii) comprising of aliphatic alkylenediamine component units and/or alicyclic alkylenediamine component units (provided that a weight of the sum total of all dicarboxylic acid component units is 100 mol %), and modified polyolefin (B) being graft modified with α,β-unsaturated carboxylic acid, anhydride or derivative thereof.

From the thermoplastic resin compositions of the invention as illustrated above, there may be prepared electrical molding parts such as connector or sliding parts such as gear.

BRIEF DESCRIPTION OF THE DRAWINGS

FIG. 1 (b) is a rough oblique view showing a portion of the above-mentioned connector at which warpage of said connector is measured.

Figure 1:
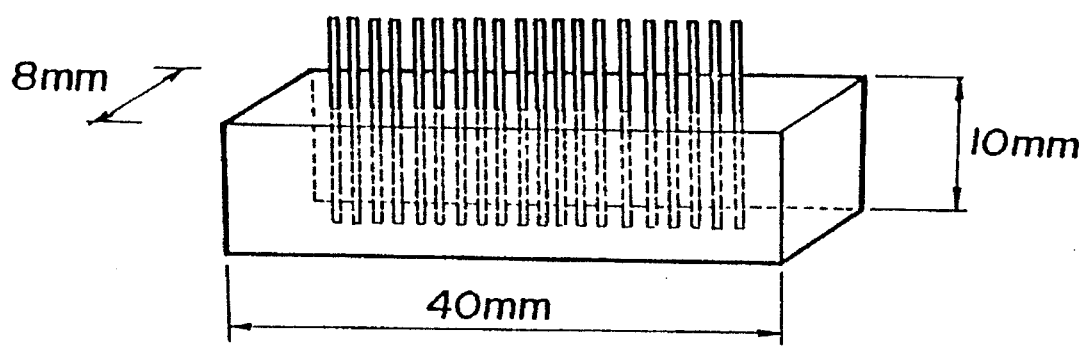
FIG. 1 (a) is an oblique view showing an external appearance of a connector prepared in the examples of the present invention and comparative examples.
Figure 1:
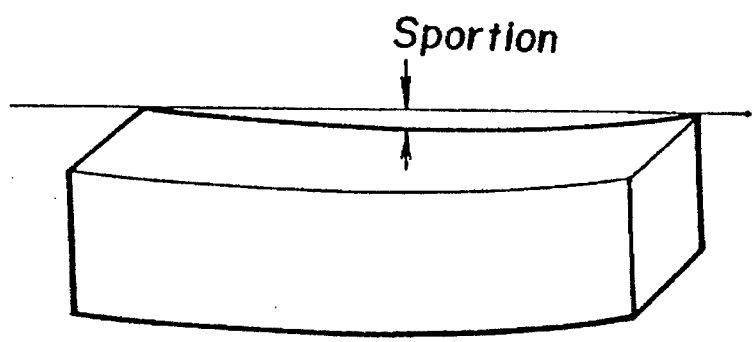

S portion in FIG. 1 (b) . . . Portion at which an amount of distortion (height of warp) of the connector is measured.

DETAILED DESCRIPTION OF THE INVENTION

The thermoplastic resin compositions of the present invention and uses thereof are illustrated below in detail.

The thermoplastic resin compositions of the invention and those for connector are comprises aromatic polyamide (A) and modified polyolefin (B).

Aromatic polyamide (A)

The aromatic polyamide (A) used in the invention is composed of a recurring unit comprising specific dicarboxylic acid component units (i) and diamine component units (ii) comprising of aliphatic alkylenediamine component units and/or alicyclic alkylenediamine component units.

In the invention, the specific dicarboxylic acid component units (i) constituting the aromatic polyamide (hereinafter simply called the polyamide) include terephthalic acid component units as essential components. The recurring unit of the polyamide containing such terephthalic acid component units as mentioned above may be represented by the following formula [I-a].

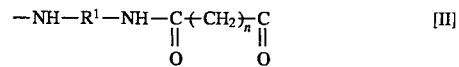

wherein $R^1$ represents aliphatic alkylene, preferably alkylene of 4–25 carbon atoms and/or alicyclic alkylene.

In the present invention, the specific dicarboxylic acid component units (i) constituting the polyamide may contain dicarboxylic acid component units other than the above-mentioned terephthalic acid component units.

Such dicarboxylic acid component units other than the terephthalic acid component units include aromatic dicarboxylic acid component units other than those derived from terephthalic acid and aliphatic dicarboxylic acid component units.

Examples of the aromatic dicarboxylic acid component units other than those derived from terephthalic acid include component units derived from isophthalic acid (IA), phthalic acid, 2-methylterephthalic acid, naphthalenedicarboxylic acid and the like. In the case where the polyamide of the invention contains the aromatic dicarboxylic acid component units other than those derived from terephthalic acid, such aromatic dicarboxylic acid component units are preferably isophthalic acid or naphthalene dicarboxylic acid component units, and especially isophthalic acid component units.

The recurring unit of the polyamide of the invention having the isophthalic acid component units other than those derived from terephthalic acid may be represented by the following formula [I-b].

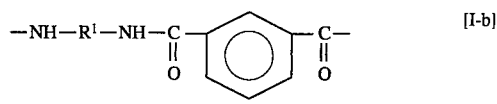

wherein $R^1$ represents aliphatic alkylene, preferably aliphatic alkylene of 4–25 carbon atoms and/or alicyclic alkylene.

In the invention, moreover, the aliphatic dicarboxylic acid component units used may be derived from aliphatic dicarboxylic acid of usually 4–20 carbon atoms, preferably 6–12 carbon atoms, though not limited particularly. Examples of the aliphatic dicarboxylic acid used for deriving such aliphatic dicarboxylic acid component units as mentioned above includes succinic acid, adipic acid (AA), azelaic acid, sebacic acid, decanedicarboxylic acid, undecanedicarboxylic acid, dodecanedicarboxylic acid and the like. In the case where the polyamide of the invention contains the aliphatic dicarboxylic acid component units, particularly preferred aliphatic dicarboxylic acid component units are adipic acid component units.

The recurring unit of the polyamide containing such aliphatic dicarboxylic acid component units may be represented by the following formula [II].

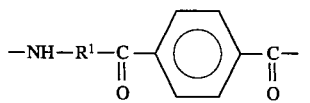

wherein n represents an integer of usually 4–20, preferably 6–12, and $R^1$ is as defined above.

The diamine component units constituting, together with the above-mentioned dicarboxylic acid component units, the polyamide of the invention are derived from aliphatic alkylenediamine component units and/or alicyclic alkylene diamine component units. Of the aliphatic alkylenediamine component units, preferred are those derived from aliphatic alkylene diamines of 4–18 carbon atoms.

Concrete examples of such aliphatic alkylenediamine component units as mentioned above are those derived from straight chain alkylenediamines such as 1,4-diaminobutane,
1,6-diaminohexane,
trimethyl-1,6-diaminohexane,
1,7-diaminoheptane,
1,8-diaminooctane,
1,9-diaminononane,
1,10-diaminodecane,
1,11-diaminoundecane,
1,12-diaminododecane, and straight chain alkylenediamines having branched chains such as 1,4-diamino-1,1-dimethylbutane,
1,4-diamino-1-ethylbutane,
1,4-diamino-1,2-dimethylbutane,
1,4-diamino-1,3-dimethylbutane,
1,4-diamino-1,4-dimethylbutane,
1,4-diamino-2,3-dimethylbutane,
1,2-diamino-1-butylethane,
1,6-diamino-2,5-dimethylhexane,
1,6-diamino-2,4-dimethylhexane,
1,6-diamino-3,3-dimethylhexane, 1,6-diamino-2,2-dimethylhexane,
1,6-diamino-2,2,4-trimethylhexane,
1,6-diamino-2,4,4-trimethylhexane,
1,7-diamino-2,3-dimethylheptane,
1,7-diamino-2,4-dimethylheptane,
1,7-diamino-2,5-dimethylheptane,
1,7-diamino-2,2-dimethylheptane,
1,8-diamino-1,3-dimethyloctane,
1,8-diamino-1,4-dimethyloctane,
1,8-diamino-2,4-dimethyloctane,
1,8-diamino-3,4-dimethyloctane,
1,8-diamino-4,5-dimethyloctane,
1,8-diamino-4,5-dimethyloctane,
1,8-diamino-3,3-dimethyloctane,
1,8-diamino-4,4-dimethyloctane,
1,6-diamino-2,4-diethylhexane,
1,9-diamino-5-methylnonane, etc.

Of the above-exemplified straight chain alkylenediamine component units or those having branched chains, preferred are the straight chain alkylenediamine component units and particularly preferred are those derived from one or two or more compounds selected from among the straight chain alkylenediamines such as 1,6-diaminohexane, 1,8-diaminooctane, 1,10-diaminodecane and 1,12-diaminododecane, and further preferred are 1,6-diaminohexane component units.

The alicyclic diamine component units are derived from diamines of usually about 6~25 carbon atoms having at least one alicyclic hydrocarbon ring.

Such alicyclic diamine component units as mentioned above include, in concrete, those derived from alicyclic diamines, for example, 1,3-diaminocyclohexane,
1,4-diaminocyclohexane,
1,3-bis(aminomethyl)cyclohexane,
1,4-bis(aminomethyl)cyclohexane,
isophoroediamine,
piperazine,
2,5-dimethylpiperazine,
bis(4-aminocyclohexyl)methane,
bis(4-aminocyclohexyl)propane,
4,4'-diamino-3,3'-dimethyldicyclohexyl propane,
4,4'-diamino-3,3'-dimethyldicyclohexyl methane,
4,4'-diamino-3,3'-dimethyl-5,5'-dimethyldicyclohexyl methane,
4,4'-diamino-3,3'-dimethyl-5,5'-dimethyldicyclohexyl propane,
α,α'-bis(4-aminocyclohexyl)-p-diisopropylbenzene,
α,α'-bis(4-aminocyclohexyl)-m-diisopropylbenzene,
α,α'-bis(4-aminocyclohexyl)-1,4-cyclohexane,
α,α'-bis(4-aminocyclohexyl)-1,3-cyclohexane, etc.

Of the alicyclic diamine component units exemplified above, preferred are those derived from alicyclic diamines such as bis(aminomethyl)cyclohexane, bis(4-aminocyclohexyl)methane, 4,4'-diamino-3,3'-dimethyldicyclohexyl methane, particularly bis(4-aminocyclohexyl)methane, 1,3-bis(aminocyclohexyl)methane and 1,3-bis(aminomethyl)cyclohexane.

Assuming that all of the dicarboxylic acid component units contained is 100 mol %, the polyamide of the invention as illustrated above is composed of the recurring unit containing 30–100 mol % of the terephthalic acid component units, 0–40 mol % of the aromatic dicarboxylic acid component units other than those derived from terephthalic acid, and 0–70 mol % of the aliphatic dicarboxylic acid component units.

The above-mentioned recurring unit may contain as the aromatic dicarboxylic acid component units a small amount of recurring units derived from polycarboxylic acid of at least tribasicity such as trimellitic acid and pyromellitic acid, in addition to the terephthalic acid component units the isophthalic acid component units, and the above-mentioned aliphatic dicarboxylic acid component units. The content of the recurring unit derived from such polycarboxylic acids as mentioned above is usually 0–5 mol %.

The polyamide as mentioned above has an intrinsic viscosity $[\eta]$, as measured in concentrated sulfuric acid at 30° C., of usually 0.5–3.0 dl/g, preferably 0.5–2.8 dl/g and especially 0.6–2.5 dl/g, and a melting point of at least 280° C. When the polyamide having such melting point as mentioned above is molded into electrical molding parts such as connector or sliding parts, the resulting molded articles are found to be excellent in heat resistance and the like.

The polyamides used in the present invention may be those containing recurring units represented respectively by the aforementioned formulas [I-a], [I-b] and [II], and also may be polyamide mixtures comprising the polyamide containing the recurring unit of said formula [I-a] as the main recurring unit, the polyamide containing the recurring unit of said formula [I-a] as the main recurring unit and the polyamide containing the recurring unit of said formula [II] as the main recurring unit.

When the polyamide used in the invention is the polyamide mixture as mentioned above, said mixture is desirably a composition comprising the polyamide containing the recurring unit of the aforementioned formula [I-a] as the main recurring unit and the polyamide containing the recurring unit of the aforementioned formula [I-b] as the main recurring unit and/or the recurring unit of the aforementioned formula [II] as the main recurring unit. In this case, the content in the composition of the polyamide containing the recurring unit of the formula [I-a] as the main recurring unit is usually at least 30% by weight.

In this case, moreover, the proportion by weight in the mixture of the polyamide containing the recurring unit of the formula [I-b] as the main recurring unit to the polyamide containing the recurring unit of the formula [II] as the main recurring unit is usually 0:100 to 40:60, preferably 0:100 to 30:70.

The aromatic polyamide used in the invention exhibit a glass transition temperature (Tg) exceedingly higher then that of polyamides used hitherto. That is, the glass transition temperature of the aromatic polyamides used in the invention is usually 70°–150° C., preferably 80°–140° C., thus it is usually higher by 20°–100° C., than that of the conventional polyamides.

The aromatic polyamides (A) as illustrated above may be prepared by various methods known per se.

For example, the above-mentioned aromatic polyamides (A) can be prepared by the solution method wherein a halide of aromatic dicarboxylic acid and a straight chain aliphatic alkylenediamine are subjected in a homogeneous solution to polycondensaton, or the interface method wherein a solution in a polar solvent of a halide of aromatic dicarboxylic acid and a solution in a non-polar solvent of a straight chain aliphatic alkylenediamine are subjected to interfacial polycondensation. Furthermore, the aromatic polyamides (A)

mentioned above may also be prepared by the solution polymerization or solid phase polymerization method.

In the present invention, the aromatic polyamide (A) is used in an amount of 80–40 parts by weight, preferably 80–60 parts by weight based on 100 parts by weight of a combined total of the aromatic polyamide (A) and modified polyolefin (B).

Modified Polyolefin (B)

The modified polyolefins (B) used in the present invention are high molecular weight modified polyolefins having an intrinsic viscosity [η] of 0.4–35 dl/g graft modified with α,β-unsaturated carboxylic acid, anhydride or derivative thereof.

The modified polyolefins as mentioned above have a crystallinity index of at least 35%, preferably at least 40%, or a glass transition temperature of at least 90° C., preferably at least 100° C., and especially 120°–170° C. The crystallinity index and the glass transition temperature of the modified resin are determined as follows.

Crystallinity index

A resin composition was melted by a hot press at 250° C., and cooled by a cold press at 23° C. to form a pressed sheet having a thickness of 1.0 mm. A sample having a size of 2×4 cm was taken from the sheet, and an X-ray diffraction curve for the sample was measured by using an X-ray diffractiometry. Based on the X-ray diffraction curve with a base line taken at the reflection angle 2θ of 4–30 degrees, the crystalline part was separated from the amorphous part and the crystallinity index of the resin expressed in terms of percent by weight was determined by measuring the area of the crystalline part.

Glass transition temperature

A resin was molded by injection at a resin temperature of 250° C. and a mold temperature of 50° C. to form a sheet having a thickness of 3 mm. After 20 hours a sample having a weight of 10 mg was taken from the sheet, and heated at a rate of 10° C./min by a differential scanning calorimeter (DSC) to obtain a heating curve in the temperature range of 0°–250° C. The glass transition temperature of the resin was determined from the heating curve.

Polyolefins used, prior to graft modification, in the invention may be obtained, for example, by polymerization or copolymerization of α-olefins of 2–20 carbon atoms.

Examples of such α-olefins as mentioned above include ethylene, propylene, butene-1, pentene-1, 2-methylbutene-1, 3-methylbutene-1, hexene-1, 3-methylpentene-1, 4-methylpentene-1, 3,3-dimethylbutene-1, heptene-1, methylhexene-1, dimethylpentene-1, trimethylbutene-1, ethylpentene-1, octene-1, methylpentene-1, dimethylhexene-1, trimethylpentene-1, ethylhexene-1, methylethylpentene-1, diethylbutene-1, propylpentene-1, decene-1, methylnonene-1, dimethyloctene-1, trimethylheptene-1, ethyloctene-1, methylethylheptene-1, diethylhexene-1, dodecene-1, hexadodecene-1, etc.

Of these α-olefins as exemplified above, preferably used, either singly or in combination, are those of 2–8 carbon atoms.

Besides the above-mentioned α-olefins, other compounds usable in the invention are, for example, chain polyene compounds and cyclic polyene compounds. The polyene compounds referred to in the invention are those having at least two conjugated or non-conjugated olefinic double bonds. Examples of the above-mentioned chain polyene compounds include 1,4-hexadiene, 1,5-hexadiene, 1,7-octadiene, 1,9-decadiene, 2,4,6-decatriene and divinylbenzene. Examples of the above-mentioned cyclic polyene compounds include 1,3-cyclopentadiene, 1,3-cyclohexadiene, 5-ethyl-1,3-cyclohexadiene, 1,3-cycloheptadiene, dicyclopentadiene, dicyclohexadiene, 5-ethylidene-2-norbornene, 5-methylene-2-norbornene, 5-vinyl-2-norbornene, 5-isopropylidene-2-norbornene, methylhydroindene, 2,3-diisopropylidene-5norbornene, 2-ethylidene-3-isopropylidene-5-norbornene and 2-propenyl-2,5-norbornadiene.

In the invention, there may also be used such polyene compounds as may be obtained by condensation of cyclopentadienes such as cyclopentadiene and α-olefins such as ethylene, propylene and butene-1, utilizing Diels-Alder reaction.

Cyclic monoene compounds may also be used in the invention, and examples of the cyclic monoene compounds include monocycloalkenes such as cyclopropene, cyclobutene, cyclopentene, cyclohexene, 3-methylcyclohexene, cycloheptene cyclooctene, cyclodecene, cyclododecene, tetracyclodecene, octacyclodecene and cycloeicosene; bicycloalkenes such as norbornene, 5-methyl-1-norbornene, 5-ethyl-2-norbornene, 5-isobutyl-2-norbornene, 5,6-dimethyl-2-norbornene, 5,5-trimethyl-2-norbornene and 2-bornene; tricycloalkenes such as 2,3,3a,7a-tetrahydro-4,7-methano-1H-indene and 3a,5,6,7a-tetrahydro-4,7-methano-1H-indene. In addition thereto, tetracycloalkenes such as 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-stearyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,8a-octahydronaphthalene, 2-chloro-1,4,5,8-dimethano-1,2,3,4,4a,5,8,8a-octahydronaphthalene, 2-bromo-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, and 2,3-dichloro-1,4,5,8-dimethano-1,2,3,4,4a,5,8,8a-octahydronaphthalene; and polycycloalkenes such as hexacyclo[6,6,1,1$^{3.6}$,1$^{10.13}$,0$^{2.7}$,0$^{9.14}$]heptadecene-4, pentacyclo[8,8,1$^{2.9}$,1$^{4.7}$,1$^{11.18}$,0,0$^{3.8}$,0$^{12.17}$]heneicosene-5 and octacyclo[8,8,1$^{2.9}$,1$^{4.7}$,1$^{11.18}$,1$^{13.16}$,0,0$^{3.8}$,0$^{12.17}$]docosene-5.

In the present invention, an intrinsic viscosity as measured in decalin at 135° C. of the polyolefins before the graft modification is 0.4–35 dl/g. However, when these polyolefins are used for preparing electrical molding parts such as connector, the intrinsic viscosity [η] thereof is preferably 0.8–15dl/g and especially 1.0–10 dl/g. When sliding parts such as gear are prepared, the polyolefins, before the graft modification, used therefor have the intrinsic viscosity [η] of preferably 1.0–15 dl/g and especially 2.0–10 dl/g.

In the present invention, α,β-unsaturated carboxylic acids or the like used as graft monomers include, for example, acrylic acid, methacrylic acid, maleic acid, fumaric acid, tetrahydrophthalic acid, itaconic acid, citraconic acid, crotonic acid, nadic acid® (endocisbicyclo [2.2.1] hept-5-en-2,3-dicarboxylic acid) or acid anhydrides thereof or derivatives thereof. These acid anhydrides or derivatives include, for example, acid halide, amides, imides and esters, including concretely malenyl chloride, malenyl imide, maleic anhydride, citraconic anhydride, monomethyl maleate and dimethyl maleate. Of these graft monomers exemplified above, preferred are unsaturated dicarboxylic acids, or acid anhydrides thereof, particularly maleic acid, nadic acid® or acid anhydrides thereof.

In the modified polyolefins (B) used in the invention, the proportion of the graft monomer used for graft modification is 0.001–0.04 mg equivalent, preferably 0.005–0.03 mg equivalent based on 1 g of the polyolefin.

In the invention, moreover, there can also be used as the graft monomers in place of the above-mentioned α,β-dicarboxylic acids or the like the modifiers used in epoxy modification of polyolefins, for example, glycidyl compounds such as glycidyl methacrylate (GMA), allyl glycidyl ether, vinyl glycidyl ether and glycidyl itaconate.

The above-mentioned modified polyolefins are desirably free from unmodified polyolefins, that is, they are preferably those modified, as they are, with such graft monomers as α,β-unsaturated carboxylic acids and the like. Molded articles obtained by the use of modified polyolefins do not exhibit excellent characteristics as expected if said modified polyolefins are those obtained by blending the modified polyolefin of the present invention and unmodified polyolefin.

In the present invention, an intrinsic viscosity [η] as measured in decalin at 135° C. of the modified polyolefin (B) is 0.4–35 dl/g. However, when these modified polyolefins (B) are used for preparing electrical molding parts such as connector, the intrinsic viscosity thereof is preferably 0.8–15 dl/g and especially 1.0–10 dl/g. When sliding parts such as gear are prepared by the use of such modified polyolefins (B), the intrinsic viscosity [η] thereof is preferably 1.0–15 dl/g and especially 2.0–10 dl/g.

By the use of the aforementioned aromatic polyamides (A) in combination with the modified polyolefins (B) having the intrinsic viscosity [η] as defined above, there are obtained thermoplastic resin compositions suitable for preparing molded articles such as connector which are excellent in balance between toughness and rigidity, impact resistance, heat resistance and water resistance and which are also excellent in resistance to deformation and self lubrication while maintaining mechanical properties inherent originally in said aromatic polyamides (A).

In preparing the modified polyolefins (B) as mentioned above by graft copolymerization on the aforementioned polyolefins as the base of the graft monomers selected from among the above-mentioned unsaturated carboxylic acids or derivatives thereof, there may be employed therefor various methods known per se. For example, there is a method wherein the graft monomer is added to the molten polyolefin, and the mixture is then subjected to graft copolymerization, or a method wherein the graft monomer is added to a solution of the polyolefin in a solvent, and the resulting solution is then subjected to graft copolymerization. In neither case, the reaction is preferably carried out in the presence of radical initiators in order to efficiently effect the graft copolymerization of the above-mentioned graft monomer. The graft reaction is carried out at a temperature usually of 60°–350° C. The proportion of the radical initiator used is usually 0.001–1 part by weight based on 100 parts by weight of the polyolefin. The radical initiators used are organic peroxides, organic peresters and azo compounds. Of these radical initiators, preferred are dialkyl peroxides such as dicumyl peroxide, di-tert-butyl peroxide, 2,5-dimethyl-2,5-di(tert-butylperoxy)hexine-3, 2,5-dimethyl-2,5-di(tert-butylperoxy)hexane, 1,4-bis(tert-butylperoxyisopropyl)benzene, etc.

In the present invention, the modified polyolefin (B) is used in an amount of 20–60 parts by weight, preferably 20–40 parts by weight based on 100 parts by weight of the aromatic polyamide (A) and modified polyolefin (B) in total.

The thermoplastic resin compositions of the present invention comprising the aromatic polyamide (A) and modified polyolefin (B) as essential components may contain additionally, if necessary, various additives such as inorganic fillers, antioxidants, ultraviolet absorbers, light protectants, heat resistant stabilizers, phosphite stabilizers, peroxide decomposers, basic adjuvants, nucleus increasing agents, plasticizers, lubricants, antistatic agents, flame retardants, pigments, dyes, etc.

The inorganic fillers as referred to above include various fillers in the form of powder, granule, plate, fiber, strand, cloth or mat. Concretely, such inorganic fillers include inorganic compounds in powder or sheet form such as silica, alumina, silica alumina, talc, diatomaceous earth, clay, kaolin, quartz, glass, mica, graphite, molybdenum disulfide, gypsum, iron oxide red, titanium dioxide, zinc oxide, aluminum, copper and stainless steel; inorganic compounds in fiber form such as glass fiber, carbon fiber, boron fiber, ceramic fiber, asbestos fiber and stainless steel fiber or fabricated products thereof such as cloth-like products.

These fillers may also be used after treating with silane or titanium coupling agents.

The above-mentioned inorganic fillers in powder form include concretely silica, silica alumina, alumina, titanium dioxide, graphite, molybdenum disulfide, polytetrafluoroethylene, etc. When graphite, molybdenum disulfide or polytetrafluoroethylene is used in particular in the thermoplastic resin compositions of the present invention, the molded articles obtained therefrom improve in abrasion resistance such as dynamic coefficient of friction, Taber abrasion index and critical PV value.

An average particle diameter of the inorganic fillers in powder form is usually 0.1–200 μm, preferably 1–100 μm. When the thermoplastic resin compositions of the invention contain these powdered inorganic fillers having the average particle diameter as defined above, the molded articles obtained therefrom markedly improve in abrasion resistance.

The powdered inorganic fillers as mentioned above are used in an amount of usually less than 200 parts by weight, preferably less than 150 parts by weight and especially 10–100 parts by weight based on 100 parts by weight of the aromatic polyamide (A) and modified polyolefin (B) in total.

The above-mentioned inorganic fillers in fiber form include concretely glass fiber, carbon fiber or boron fiber. When such inorganic fiber is used in the thermoplastic resin compositions of the invention, the molded articles obtained therefrom improve in mechanical characteristics such as tensile strength, bending strength and bending modulus of elasticity, heat resisting characteristics such as heat distortion temperature, and physicochemical characteristics such as water resistance.

An average length of the fibrous inorganic fillers as mentioned above is usually 0.1–20 mm, preferably 10–10 mm. The thermoplastic resin compositions of the invention containing these fibrous inorganic fillers having the average length as defined above improve in moldability, and the molded articles obtained therefrom also improve in heat resisting characteristics such as heat distortion temperature, and mechanical characteristics such as tensile strength and bending strength.

The fibrous inorganic fillers as mentioned above are contained in the thermoplastic resin compositions of the invention in an amount of usually less than 150 parts by weight, preferably 5–100 parts by weight and especially 10–50 parts by weight.

The thermoplastic resin compositions of the invention may be prepared by incorporating the fillers into the aforementioned components constituting said thermoplastic resin compositions being maintained at a molten state. In this case, an extruder, kneader or the like may be used therefor.

The thermoplastic resin compositions of the invention as illustrated above may be molded by the usual molding method, for example, compression molding, injection molding or extrusion molding method.

The thermoplastic resin compositions of the invention are molded by the usual molding method into molded articles for various purposes such as connector, coil bobbin, housing, etc. used in the fields of automotive and electrical electronic industries.

Furthermore, the thermoplastic resin compositions of the invention are molded likewise into sliding parts, for example, gear, cam (including dumper cam), switch (including microswitch), roller, reel, bush, etc. used in domestic electrical appliances, such as video, radio casette, air conditioner, electric washing machine and refrigerator; gear, switch, lever, key board, key slide, etc. used in OA appliances such as facsimile, computer, typewriter, word processor and duplicator; bearing, roller, bucket, packer, gear, etc. used in machines for general purposes such as conveyer, combine, vending machine and hygienic instrument; suspension bush used in automobile; door fitting, curtain roller, sash guide roller, impeller for water meter, etc. used in constructional material; and gears used in toys.

EFFECTS OF THE INVENTION

The thermoplastic resin compositions of the present invention comprise an aromatic polyamide (A) comprising an aromatic dicarboxylic acid component unit (i) containing terephthalic acid component unit as the main component unit and a specific diamine component unit (ii) and a high molecular weight modified polyolefin (B) with a specific crystallinity index modified with a graft monomer such as α,β-unsaturated carboxylic acid anhydride or the like in a specific proportion, and hence they are excellent in moldability. Thus, the thermoplastic resin compositions of the invention have such effects that they give relatively inexpensive molded articles excellent in balance between toughness and rigidity, impact resistance, heat resistance, self lubrication and water resistance and, at the same time, excellent in resistance to heat distortion.

The present invention is illustrated below in detail with reference to examples, but it should be constructed that the invention is in no way limited to those examples.

EXAMPLE 1

[Preparation of aromatic polyamide]

A 1.0 liter reactor was charged with 254 g (2.19M) of 1,6-diaminohexane, 247 g (1.49M) of terephthalic acid, 106 g (0.64M) of isophthalic acid, 0.45 g ($4.25 \times 10^{-3}$M) of sodium hypophosphite as a catalyst and 148 ml of ion-exchanged water, and the atmosphere of the reactor was replaced with nitrogen to carry out reaction at 250° C. at 35 kg/cm² for 1 hour. After the completion of the reaction, the reaction product was withdrawn from the reactor to a receptacle preset to a pressure lower by about 10 kg/cm² than that of the reactor to obtain 545 g of polyamide having an intrinsic viscosity of 0.10 dl/g (in conc. sulfuric acid at 30° C.).

Subsequently, this polyamide was dried and then subjected to melt polymerization using a double-screw extruder at a cylinder temperature preset at 330° C. to obtain aromatic polymide having an intrinsic viscosity [η] of 1.1 dl/g (in conc. sulfuric acid at 30° C.).

The aromatic polyamide thus obtained had 71 mol % of terephthalic acid component units and a melting point of 320° C.

[Preparation of modified polyethylene]

A thoroughly stirred mixture of 5 kg of pellets of a high density polyethylene having an intrinsic viscosity [η] of 3.74 dl/g and a crystallinity index of 75%, a solution of 50 g of maleic anhydride in 25 g of acetone and 2 g of an organic peroxide (Perhexine 25B, a product of Nippon Oils and Fats Co., Ltd.) was allowed to undergo reaction at a molten state using a double-screw extruder (PCM 45 of Ikegai Iron Works, Ltd.) at a cylinder temperature of 250° C., and the reaction product was then pelletized by means of a pelletizer.

A crystallinity index of the modified polyethylene was measured by X-ray diffractometry.

The modified polyethylene thus obtained has a crystallinity index of 75% and an intrinsic viscosity [η] of 3.5 dl/g as measured in decalin at 135° C.

The resin thus obtained had the maleic anhydride content of 0.96% by weight.

[Preparation of thermoplastic resin composition]

Using a Henschel mixer (75 l capacity, manuf. by Mitsuike Seisakusho K.K.), there was prepared a mixture comprising 60 parts by weight of the above-mentioned aromatic polyamide and 40 parts by weight of the above-mentioned modified polyethylene and, as formulation ingredients, 0.35 part by weight of tetrakis [methylene (3,5-di-t-butyl-4-hydroxy) hydrocinnamate] methane (IRGANOX 1010, a product of Nippon Ciba-Geigy Co., Ltd.), 0.1 part by weight of tetrakis (2,4-di-t-butylphenyl)-4,4-biphenylene diphosphite (SIDESTAB P-EPQ, a product of SANDOZ Co.) and 0.08 part by weight of calcium stearate (a product of Nippon Oils and Fats Co., Ltd.). The mixture was then pelletized into pellets by using a double-screw extruder (PCM-45 manuf. by Ikegai Iron Works, Ltd.) at a cylinder temperature preset to 320° C. and a screw speed of 150 rpm.

The pellets of the aromatic polyamide resin composition thus obtained were injection molded using an injection molding machine (IS-55 manuf. by Toshiba Machine Co., Ltd.) into a square plate under the following conditions.

[Injection molding conditions]

Cylinder temperature (°C.):320

Injection pressure (kg/cm²):Primary/secondary=

1000/800

Mold temperature (°C.):50

The square plate thus prepared was evaluated in terms of tensile properties, bending properties, impact resistance, heat resistance and self-lubricating properties according to the following method. [Method of evaluation]

(1) Tensile properties

The test piece having the shape of ASTM No. 4 is tested in accordance with ASTM D 638 to obtain tensile strength at break (TS:kg/cm²) and elongation at break (EL:%).

(2) Bending properties

With the test piece of 3 mm×12.7 mm×127 mm, bending test is carried out in accordance with ASTM D 790 to obtain bending strength and bending modulus.

(3) Impact resistance

With the test piece of 3 mm×12.7 mm×63.5 mm, impact test is carried out in accordance with ASTM D 256 (notched) to obtain impact strength.

(4) Heat resistance

Heat resistance is evaluated in terms of heat distortion temperature.

The heat distortion temperature is measured in accordance with ASTM D 648 using a heat distortion tester (manuf. by Toyo Seiki K.K.).

Size of test specimen: 6 mm×12.7 mm×127 mm

Load: 4.64 kg/cm$^2$ or 18.6 kg/cm$^2$ (5) Self-lubricating properties (i) Coefficient of dynamic friction: Using a frictional abrasion tester of Matsubara's system (manuf. by Toyo Baldwin K.K.), friction test on the test piece is carried out for 30 minutes under the conditions of a compression load of 7.5 kg/cm$^2$ and a sliding speed of 12 m/min. The material used standing opposite to the test piece is SUS 304 having a sliding surface with roughness of 6s. Test piece used: Square injection molded plate (130 mm×120 mm×3 mm)

(ii) Critical PV value (kg/cm$^2$.m/min.): Using the same frictional abrasion tester as mentioned above, friction test is carried out for 30 minutes under the conditions of a sliding speed of 12 m/min. and a compression load of 2.5 kg/cm$^2$ which is increased stepwide up to 25 kg/cm$^2$ at intervals of 2.5 kg/cm$^2$ to obtain PV value at which the resin of the test piece melts by frictional heat. The material used standing opposite to the test piece is SUS 304 having a sliding surface with roughness of 6s. Test piece used: Square injection molded plate (130 mm×120 mm×3 mm)

As used herein, the term critical PV value is intented to mean a critical value at which a bearing material melts or seizes by heat developed when the load (P) and speed (V) applied to the bearing material exceed certain levels.

Results of evaluation are shown in Table 1.

EXAMPLE 2

Pellets and a square plate were obtained by repeating Example 1 except that there were used 80 parts by weight of the above-mentioned aromatic polyamide, and 20 parts by weight of the undermentioned modified polyethylene in place of 40 parts by weight of the modified polyethylene used in Example 1. The square plate thus obtained was evaluated in terms of the aforementioned physical properties.

[Preparation of modified polyethylene]

A thoroughly stirred mixture of 5 kg of pellets of a high density polyethylene having an intrinsic viscosity [η] of 1.45 dl/g and a crystallinity index of 80%, a solution of 50 g of maleic anhydride in 25 g of acetone and 2 g of an organic peroxide (Perhexine 25 B, a product of Nippon Oils and Fats Co., Ltd.) was allowed to undergo reaction at a molten state using a double-screw extruder (PCM 45 of Ikegai Iron Works, Ltd.) at a cylinder temperature of 250° C., and the reaction product was pelletized by means of a pelletizer.

The modified polyethylene thus obtained has a crystallinity index of 80% and an intrinsic viscosity [η] of 1.30 dl/g as measured in decalin at 135° C.

The resin thus obtained had the maleic anhydride content of 0.97% by weight.

Results of evaluation are shown in Table 1.

Comparative Example 1

Pellets and a square plate were obtained by repeating Example 1 except that 100 parts by weight of polycapramide (nylon 6, product No. A 1030BRL, a product of Unitika Ltd.) was used in place of the aromatic polyamide and modified polyethylene used in Example 1. The square plate thus obtained was evaluated in terms of the aforementioned physical properties.

Results of evaluation are shown in Table 1.

EXAMPLE 3

Pellets and a square plate were obtained by repeating Example 1 except that the amounts of the aromatic polyamide and modified polyethylene were changed to 90 parts by weight and 10 parts by weight, respectively. The square plates thus obtained was evaluated in terms of the aforementioned physical properties.

Results of evaluation are shown in Table 1.

EXAMPLE 4

Pellets and a square plate were obtained by repeating Example 1 except that the amount of the aromatic polyamide used was changed to 80 parts by weight, and 20 parts by weight of the undermentioned modified polyethylene was used in place of 40 parts by weight of the modified polyethylene used in Example 1. The square plate thus obtained was evaluated in terms of the aforementioned physical properties.

[Preparation of modified polyethylene]

A thoroughly stirred mixture of 5 kg of pellets of a high density polyethylene having as intrinsic viscosity [η] of 2.3 dl/g and a crystallinity index of 79%, a solution of 50 g of maleic anhydride in 25 g of acetone and 2 g of an organic peroxide (perhexine 25 B, a product of Nippon Oils and Fats Co., Ltd.) was allowed to undergo reaction at a molten state using a double-screw extruder (PCM 45 manuf. by Ikegai Iron Works Ltd.) at temperature of 250° C., and the reaction product was pelletized by means of pelletizer.

The modified polyethylene thus obtained has a crystallinity index of 79% and an intrinsic viscosity [η] of 2.10 dl/g as measured in decalin at 135° C.

The resin thus obtained had the maleic anhydride content of 0.98% by weight.

Results of evaluation are shown in Table 1.

Comparative Example 2

Pellets and square plate were obtained by repeating Example 1 except that 100 parts of the aromatic polyamide of Example 1 was used in place of the aromatic polyamide and modified polyethylene used in Example 1. The square plate thus obtained was evaluated in terms of the aforementioned physical properties.

Results of evaluation are shown in Table 1.

Comparative Example 3

Pellets and a square plate were obtained by repeating Example 1 except that the amount of the aromatic polyamide used was changed to 80 parts by weight, and 20 parts by weight of the undermentioned ultra-high-molecular-weight polyethylene was used in place of 40 parts by weight of the modified polyethylene used in Example 1. The square plate thus obtained was evaluated in terms of the aforementioned physical properties.

[Preparation of ultra-high-molecular-weight polyethylene]

A 2-liter autoclave was charged with 750 ml of purified hexane, and the autoclave was further charged with stirring with 0.75 mmol of triethylaluminum, 0.075 mmol of diphenyldimethoxysilane and 0.075 mmol in terms of titanium atom of a prepolymerized catalyst component. Thereafter, the temperature inside the autoclave was elevated up to 70° C. to carry out polymerization while feeding ethylene at 70° C. over a period of 5 hours so as to maintain the total pressure of 6.0 kg/cm² G in the autoclave.

After the completion of the polymerization, the temperature was decreased and the pressure was released. The yield of the ultra-high-molecular-weight polyethylene thus obtained was 198 g, and this polyethylene had an intrinsic viscosity (in decalin at 135° C.) of 17.4 dl/g and a torque of 42 kg.cm.

Comparative Example 4

Pellets and a square plate were obtained by repeating Example 1 except that 80 parts by weight of polycapramide (nylon 6, product No. A1030BRL, a product of Unitika Ltd.) and 20 parts by weight of the ultra-high-molecular-weight the reaction product was drawn from the reactor to a receptacle preset to a pressure lower by about 10 kg/cm² than that of the reactor to obtain 510 g of polyamide having an intrinsic viscosity [η] of 0.18 dl/g (in conc. sufuric acid at 30° C.).

Subsequently, this polyamide was dried and then subjected to melt polymerization using a double-screw extruder at a cylinder temperature preset to 310° C. obtain aromatic polyamide having an intrinsic viscosity [η] of 1.13 dl/g (in conc. sufuric acid at 30° C.).

The aromatic polyamide thus obtained had 71 mol/% of terephalic acid component units and a melting poit of 281° C.

TABLE 1

|  | Ex. 1 | Ex. 2 | Ex. 3 | Ex. 4 | Compar. Ex. 1 | Compar. Ex. 2 | Compar. Ex. 3 | Compar. Ex. 4 | Ex. 5 |
|---|---|---|---|---|---|---|---|---|---|
| Tensile strength at break [Kg/cm²] Absolute dry at 23° C. | 590 | 800 | 930 | 820 | 810 | 990 | 650 | 560 | 550 |
| Elogation at break [%] Absolute dry at 23° C. | 30 | 20 | 18 | 19 | 100 | 4 | 3 | 10 | 38 |
| Blending strength [Kg/cm²] |  |  |  |  |  |  |  |  |  |
| Absolute dry at 23° C. | 900 | 1180 | 1290 | 1210 | 1180 | 1640 | 1060 | 820 | 860 |
| Absolute dry at 100° C. | 450 | 700 | 750 | 750 | 250 | 850 | 670 | 160 | 430 |
| Bending modulus [Kg/cm²] |  |  |  |  |  |  |  |  |  |
| Absolute dry at 23° C. | $2.4 \times 10^4$ | $2.9 \times 10^4$ | $3.0 \times 10^4$ | $2.8 \times 10^4$ | $2.9 \times 10^4$ | $3.5 \times 10^4$ | $2.7 \times 10^4$ | $2.0 \times 10^4$ | $2.3 \times 10^4$ |
| Absolute dry at 100° C. | $1.4 \times 10^4$ | $2.1 \times 10^4$ | $2.2 \times 10^4$ | $2.0 \times 10^4$ | $0.5 \times 10^4$ | $3.0 \times 10^4$ | $1.9 \times 10^4$ | $0.3 \times 10^4$ | $1.3 \times 10^4$ |
| Izod impact strength [Kg · cm/cm²] (notched) Absolute dry at 23° C. | 20 | 15 | 13 | 14 | 7 | 8 | 3 | 3 | 23 |
| Heat distortion temperature [°C.] | 150 | 165 | 176 | 168 | 190 | 280 | 146 | 120 | 147 |
| Coefficient of dynamic friction | 0.12 | 0.16 | 0.19 | 0.18 | 0.35 | 0.63 | 0.40 | 0.22 | 0.13 |
| Critical PV value [Kg/cm² · m/min.] | at least 300 | at least 300 | at least 300 | at least 300 | 90 | 60 | 150 | 200 | at least 300 | polyethylene of Comparative Example 3 were used in place of the aromatic polyamide and modified polyethylene of Example 1. The square plate thus obtained was evaluated in terms of the aforementioned physical properties.

Results of evaluation are shown in Table 1.

EXAMPLE 5

Pellets and a square plate were obtained by repeating Example 1 except that the undermentioned aromatic polyamide was used in place of the aromatic polyamide used in Example 1. The square plate thus obtained was evaluated in terms of the aforementioned physical properties.

Results of evaluation are shown in Table 1.
[Preparation of aromatic polyamide]

A 1.0 liter reactor was charged with 255.6 g (2.2M) of 1,6-diaminohexane, 109.6 g (0.66M) of terephthalic acid (TA), 225.1 g (1.54M) of adipic acid (AA), 0.47 g ($4.4 \times 10^{-3}$M) of sodium hypophosphite as a catalyst and 146 ml of ion-exchanged water, and the atmosphere of the reactor was replaced with nitrogen to carry out reaction for 1 hour at 250° C. and 35 kg/cm². After the completion of the reaction,

EXAMPLE 6

Following substantially the same procedure as described in Example 1, pellets of an aromatic polyamide resin composition were prepared, and this composition was injection molded into a square plate.

The square plate thus obtained was evaluated in terms. of the aforementioned physical properties according to the same method as in Example 1 and, in addition, was evaluated in terms of water resistance and resistance to deformation.
(5) Water resistance Evaluation of water resistance is expressed in terms of water absorbing capacity.

The water absorbing capacity is obtained in accordance with ASTM D 570 by measuring the water content of a test piece of a 3 mm thick immersed in water at 23° C. for 24 hours and for 96 hours.
(6) Resistance to deformation Evaluation of resistance to deformation is expressed in terms of the degree of warpage.

The degree of distortion is expressed by the amount of distortion (hight of warpage) measured in S portion of a connector as shown in FIG. 1(b) allowed to stand for 12 hours in a decicator provided with a drying agent, said connector being prepared by injection molding of the aromatic resin composition as mentioned above and having 20 pin holes as shown in FIG. 1(a).

Results of evaluation are shown in Table 2.

EXAMPLE 7

Pellets, a square plate and a connector were obtained by repeating Example 6 but using 60 parts by weight of the aromatic polyamide, and using 10 parts by weight of the undermentioned modified polypropylene in place of the modified polyethylene of Example 6. The square plate and connector thus obtained were evaluated in terms of the aforementioned physical properties.

[Preparation of modified polypropylene]

A stainless steel autoclave equipped with an agitating element having a spiral double ribbon was charged with 5 kg of polypropylene having MFR of 0.33 kg/10 min as measured under the conditions of 230° C. and 2160 g, an intrinsic viscosity [η] of 4.40 dl/g and a crystallinity index of 55%, and the atmosphere of the system was replaced completely with nitrogen.

Subsequently, a solution of 113.5 g of maleic anhydride and 8.5 g of benzoyl peroxide in 1 liter of toluene was added dropwise to the system over a period of 10 minutes, while stirring the polypropylene at room temperature, and the stirring was continued at room temperature for 30 minutes. Thereafter, the temperature inside the system was elevated to 100° C. to carry out reaction for 4 hours.

After the completion of the reaction, the temperature inside the system was decreased to 60° C., 10 liters of acetone was added, the temperature was elevated to 80° C., and stirring was carried out for 1 hour. Subsequently, the temperature was decreased to room temperature, and the slurry obtained was filtered, washed with acetone and dried under reduced pressure to obtain a modified polypropylene.

In order to determine the amount of grafted monomer, the modified polypropylene thus obtained was purified by dissolving it in p-xylene at 130° C. followed by cooling, and separating out in acetone to remove ungrafted products therefrom.

The amount of grafted monomer was determined by measuring by IR absorbance of carbonyl group of the purified modified polypropylene followed by reference to the calibration curve prepared in advance.

As a result, the modified polypropylene obtained had the amount of grafted monomer of 0.2% by weight, MFR of 1.5 g/10 min as measured at 230° C. and 2160 g, a crystallinity index of 57%, and an intrinsic viscosity [η] of 3.57 dl/g.

Results of evaluation are shown in Table 2.

Comparative Example 5

Pellets, a square plate and a connector were obtained by repeating Example 6 but using 100 parts by weight of polyhexamethylene adipamide (nylon 66, product No. 2020B, a product of Ube Industries, Ltd.) in place of the aromatic polyamide and modified polyethylene used in Example 6. The square plate and connector thus obtained were evaluated in terms of the aforementioned physical properties.

Results of evaluation are shown in Table 2.

Comparative Example 6

Pellets, a square plate and a connector were obtained by repeating Example 6 but 100 parts by weight of polybutyleneterephthalate (PBT) (PBT, product No. 1401, a product of Toray Ind. Ltd.) in place of the aromatic polyamide and modified polyethylene used in Example 6. The square plate and connector thus obtained were evaluated in terms of the aforementioned physical properties.

Results of evaluation are shown in Table 2.

TABLE 2

|  | Ex. 6 | Ex. 7 | Compar. Ex. 5 | Compar. Ex. 6 |
|---|---|---|---|---|
| Tensile strength at break [kg/cm$^2$] absolute dry at 23° C. | 800 | 700 | 800 | 550 |
| Elongation at break [%] absolute dry at 23° C. | 20 | 15 | 120 | 100 |
| Bending strength [kg/cm$^2$] | | | | |
| absolute dry at 23° C. | 1100 | 1200 | 1200 | 900 |
| absolute dry at 100° C. | 700 | 600 | 250 | 200 |
| Bending modulus [kg/cm$^2$] | | | | |
| absolute dry at 23° C. | 2.9 × 10$^4$ | 3.3 × 10$^4$ | 3 × 10$^4$ | 2.8 × 10$^4$ |
| absolute dry at 100° C. | 2.1 × 10$^4$ | 1.7 × 10$^4$ | 4 × 10$^4$ | 3 × 10$^4$ |
| Izod impact strength [kg · cm/cm$^2$] (notched) absolute dry at 23° C. | 15 | 12 | 7 | 5 |
| Heat distortion temperature [°C.] | 125 | 130 | 85 | 87 |
| Water absorption [%] | | | | |
| in water 1 day at 23° C. | 0.4 | 0.2 | 1.7 | 0.02 |
| in water 4 days at 23° C. | 0.6 | 0.3 | 2.5 | 0.02 |
| Height of warpage [mm] | below 0.1 | 0.1 | 0.7 | 1.0 |
| 4 days after in water at 23° C.    Bending strength [Kg/cm$^2$] | 1000 | 1040 | 670 | 550 |
|    Dimentional change [%] | 0.10 | 0.07 | 0.30 | 0 |

EXAMPLE 8

Pellets, a square plate and a connector were obtained by repeating Example 6 but using the amounts of the aromatic polyamide and modified polyethylene changed to 60 parts by weight and 40 parts by weight, respectively. The square plate and connector thus obtained were evaluated in terms of the aforementioned physical properties.

Results of evaluation are shown in Table 2.

EXAMPLE 9

Pellets, a square plate and a connector were obtained by repeating Example 6 but using the undermentioned modified cycloolefin copolymer in place of the modified polyethylene. The square plate and connector thus obtained were evaluated in terms of the aforementioned physical properties.

[Preparation of modified cycloolefin copolymer]

A thoroughly stirred mixture of 5 kg of pellets of a random copolymer of ethylene and 1,4,5,8-dimethano-1,2,3,4,4a5,8,8,a-octahydronaphthalene having the ethylene content of 62 mol % as measured by $^{13}$C-NMR, MFR (260° C.) of 35 g/10 min, an intrinsic viscosity [η] of 0.47 dl/g as measured in decalin at 135° C., a glass transition temperature of 145° C. (structural formula

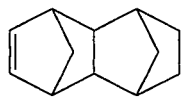

hereinafter called DMON for short), a solution of 50 g of maleic anhydride in 25 g of acetone, and 3 g of an organic peroxide (Perhexine 25B, a product of Nippon Oils and Fats Co., Ltd.) was allowed to undergo reaction in a molten state using a double-screw extruder (PCM 45 manuf. by Ikegai Iron Works, Ltd.) at a cylinder temperature of 250° C., and the reaction product was pelletized by means of a pelletizer.

The modified cycloolefin copolymer thus obtained has a glass transition temperature of 145° C. and an intrinsic viscosity [η] of 0.42 dl/g as measured in decalin at 135° C.

The resin thus obtained had the maleic anhydride content of 0.8% by weight.

Results of evaluation are shown in Table 2.

EXAMPLE 10

Pellets, a square plate and a connector were obtained by repeating Example 6 but using the undermentioned modified poly-4-methylpentene-1 in place of the modified polyethylene used in Example 6. The square plate and connector thus obtained were evaluated in terms of the aforementioned physical properties.

[Modified poly-4-methylpentene]

A stainless steel autoclave equipped with an agitating element having a spiral double ribbon was charged with 5 kg of poly-4-methylpentene-1 having an intrinsic viscosity [η] of 2.2 dl/g and a crystallinity index of 40%, and the atmosphere of the system was replaced completely with nitrogen. Subsequently, a solution of 113.5 g of maleic anhydride and 8.5 g of benzoyl peroxide in 1 liter of toluene was added dropwise to the autoclave over a period of 10 minutes, while stirring the poly-4methylpentene-1 at room temperature, and the stirring was then continued at room temperature for 30 minutes. Thereafter, the temperature inside the system was elevated to 100° C. to carry out reaction for 4 hours.

After the completion of the reaction, the temperature inside the system was decreased to 60° C., 10 liters of acetone was added, and the temperature was elevated to 80° C. to carry out the stirring for 1 hour. Subsequently, the temperature was decreased to room temperature, and the slurry obtained was filtered, washed with acetone and then dried under reduced pressure to obtain a modified poly-4-methylpentene-1.

In order to determine the amount of grafted monomer, the modified poly-4-methylpentene-1 thus obtained was purified by dissolving it in p-xylene at 130° C. followed cooling, and separating out in acetone to remove ungrafted products therefrom.

The amount of grafted monomer was determined by measuring IR absorbance of carbonyl of the purified modified poly-4-methylpentene-1, followed by reference to the calibration curve prepared in advance.

As a result, the modified poly-4-methylpentene-1 obtained had the amount of grafted monomer of 0.3% by weight, a crystallinity index of 40%, and an intrinsic viscosity [η] of 1.76 dl/g.

Results of evaluation are shown in Table 3.

Comparative Example 7

Pellets, a square plate and a connector were obtained by repeating Example 6 but using an unmodified polyethylene (Hizex 8000F, a product of Mitsui Petrochemical Ind., Ltd.) in place of the modified polyethylene used in Example 6. The square plate and connector thus obtained were evaluated in terms of the aforementioned physical properties.

Results of evaluation are shown in Table 3.

EXAMPLE 11

Pellets, a square plate and a connector were obtained by repeating Example 6 but using the undermentioned aromatic polyamide in place of the aromatic polyamide used in Example 6.

Results of evaluation are shown in Table 3.

[Preparation of aromatic polyamide]

A 1.0 liter reactor was charged with 255.6 g (2.2M) of 1,6-diaminohexane, 109.6 g (0.66M) of terephthalic acid (TA), 225.1 g (1.54M) of adipic acid (AA), 0.47 g (4.4×10⁻³M) of sodium hypophosphite as a catalyst, and 146 ml of ion-exchanged water, and the atmosphere of the reactor was replaced with nitrogen to carry out reaction for 1 hour at 250° C. and 35 kg/cm². After the completion of the reaction, the reaction product was withdrawn from the reactor to a receptacle preset to a pressure lower by about 10 kg/cm² than that of the reactor to obtain 510 g of polyamide having an intrinsic viscosity of 0.18 dl/g (in conc. sulfuric acid at 30° C.).

Subsequently, this polyamide was dried and then subjected to melt polymerization using a double-screw extruder at a cylinder temperature preset at 310° C. to obtain aromatic polyamide having an intrinsic viscosity [η] of 1.13 dl/g (in conc. sulfuric acid at 30°).

The aromatic polyamide thus obtain had 30 mol % of terephthalic acid componont units and a melting point of 281° C.

TABLE 3

|  | Ex. 8 | Ex. 9 | Ex. 10 | Compar. Ex. 7 | Ex. 11 |
|---|---|---|---|---|---|
| Tensile strength at break [kg/cm²] | 590 | 750 | 710 | 570 | 760 |

TABLE 3-continued

|  | Ex. 8 | Ex. 9 | Ex. 10 | Compar. Ex. 7 | Ex. 11 |
|---|---|---|---|---|---|
| absolute dry at 23° C. Elongation at break [%] | 20 | 12 | 15 | 3 | 25 |
| absolute dry at 23° C. Bending strength [kg/cm$^2$] | | | | | |
| absolute dry at 23° C. | 900 | 1400 | 1050 | 1080 | 1050 |
| absolute dry at 100° C. | 450 | 810 | 690 | 670 | 640 |
| Bending modulus [kg/cm$^2$] | | | | | |
| absolute dry at 23° C. | 2.4 × 10$^4$ | 3.5 × 10$^4$ | 2.8 × 10$^4$ | 2.7 × 10$^4$ | 2.8 × 10$^4$ |
| absolute dry at 100° C. | 1.4 × 10$^4$ | 2.9 × 10$^4$ | 2.0 × 10$^4$ | 1.9 × 10$^4$ | 2.0 × 10$^4$ |
| Izod impact strength [kg · cm/cm$^2$] (notched) absolute dry at 23° C. | 25 | 5 | 10 | 3 | 18 |
| Heat distortion temperature [°C.] | 117 | 145 | 125 | 117 | 119 |
| Water absorption [%] | | | | | |
| in water 1 day at 23° C. | 0.2 | 0.4 | 0.4 | 0.4 | 0.4 |
| in water 4 days at 23° C. | 0.4 | 0.6 | 0.6 | 0.6 | 0.6 |
| Height of warpage [mm] | 0.2 | at least 0.1 | at least 0.1 | 0.1 | at least 0.1 |
| In water 4 days after at 23° C. Bending strength [kg/cm$^2$] | 720 | 1250 | 980 | 920 | 970 |
| Dimentional change [%] | 0.07 | 0.10 | 0.10 | 0.11 | 0.01 |

What is claimed is:

1. A sliding part composed of a thermoplastic resin composition comprising

80–60 parts by weight of an aromatic polyamide (A) having an intrinsic viscosity ($\eta$) of 0.5–3.0 dl/g, as measured in concentrated sulfuric acid at 30° C., and a melting point of at least 280° C.; and 20–40 parts by weight of a modified polyethylene (B) having a crystallinity index of at least 35% and an intrinsic viscosity ($\eta$) of 2.0–10 dl/g, with the proviso that the sum total of component (A) and component (B) is 100 parts by weight;

wherein said aromatic polyamide (A) is composed of recurring units (i) comprising 30–100 mol % of terephthalic acid component units, 0–40 mol % of aromatic dicarboxylic acid component units other than the terephthalic acid component units and 0–70 mol % of aliphatic dicarboxylic acid component units; and recurring units (ii) comprising at least one unit selected from the group consisting of aliphatic alkylenediamine component units and alicyclic alkylenediamine component units; and wherein said modified polyethylene (B) has been graft modified with $\alpha,\beta$-unsaturated carboxylic acid or anhydride thereof.

2. The sliding part as claimed in claim 1 wherein said sliding part includes gear, cam and switch.

3. The sliding part as claimed in claim 1 wherein said graft modified polyethylene contains 0.001–0.04 mg equivalent of $\alpha,\beta$-unsaturated carboxylic acid or anhydride thereof per gram of polyethylene.

\* \* \* \* \*